(12) United States Patent
Dornbusch et al.

(10) Patent No.: US 8,932,720 B2
(45) Date of Patent: Jan. 13, 2015

(54) CURING COMPOSITIONS FOR COATING COMPOSITE MATERIALS

(75) Inventors: Michael Dornbusch, Düsseldorf (DE); Hendrik Narjes, Münster (DE); Doris Austermann, Drensteinfurt (DE)

(73) Assignee: BASF Coatings GmbH, Munster (DE)

( * ) Notice: Subject to any disclaimer, the term of this patent is extended or adjusted under 35 U.S.C. 154(b) by 351 days.

(21) Appl. No.: 13/063,999

(22) PCT Filed: Sep. 14, 2009

(86) PCT No.: PCT/EP2009/006628
§ 371 (c)(1),
(2), (4) Date: May 25, 2011

(87) PCT Pub. No.: WO2010/028848
PCT Pub. Date: Mar. 18, 2010

(65) Prior Publication Data
US 2011/0268964 A1 Nov. 3, 2011

(30) Foreign Application Priority Data
Sep. 15, 2008 (DE) .......... 10 2008 047 359

(51) Int. Cl.
*B32B 27/40* (2006.01)
*H01B 1/06* (2006.01)
*C08J 7/18* (2006.01)
*B05D 1/38* (2006.01)

(52) U.S. Cl.
USPC ........ 428/423.1; 428/375; 252/507; 252/511; 427/500; 427/514; 427/407.1; 427/407.3; 264/104; 264/105

(58) Field of Classification Search
USPC ........ 428/375, 423.1; 264/104, 105; 252/507, 252/511; 427/500, 514, 407.1, 407.3
See application file for complete search history.

(56) References Cited

U.S. PATENT DOCUMENTS

| 4,011,176 A | 3/1977 | Saunders et al. |
| 4,155,896 A | 5/1979 | Rennier et al. |
| 6,797,771 B2 * | 9/2004 | Sapper et al. ................. 524/728 |
| 2007/0269661 A1 * | 11/2007 | Graham .................... 428/423.1 |

FOREIGN PATENT DOCUMENTS

| DE | 19644615 C1 | 3/1998 |
| DE | 19740757 A1 * | 3/1999 |
| DE | 19948821 A1 | 5/2001 |
| DE | 10106567 A1 | 8/2002 |
| DE | 102005010964 A1 | 9/2006 |
| DE | 102005032346 A1 | 1/2007 |
| DE | 102007001653 A1 | 7/2008 |
| EP | 1600484 A1 | 11/2005 |
| EP | 1647583 A1 | 4/2006 |
| FR | 2874927 A1 | 3/2006 |
| JP | 2005154632 A | 6/2005 |
| WO | WO0105895 A1 | 1/2001 |
| WO | WO0127211 A1 | 4/2001 |
| WO | WO0202704 A1 | 1/2002 |
| WO | W02004069942 A1 | 8/2004 |
| WO | WO2005010107 A1 | 2/2005 |
| WO | WO2005110622 A2 | 11/2005 |
| WO | WO2005114324 A2 | 12/2005 |
| WO | WO2006084523 A1 | 8/2006 |
| WO | WO2007005808 A2 | 1/2007 |
| WO | WO2008085550 A2 | 7/2008 |
| WO | WO2009043743 A1 | 4/2009 |

OTHER PUBLICATIONS

International Preliminary Report on Patentability for International application No. PCT/EP2009/006628 dated Mar. 15, 2011.
International Search Report for International Application No. PCT/EP2009/006628 dated Jan. 12, 2010.
Written Opinion for International Application No. PCT/EP2009/006628.

* cited by examiner

*Primary Examiner* — Thao T. Tran
(74) *Attorney, Agent, or Firm* — Cantor Colburn LLP

(57) ABSTRACT

The present invention describes the use of a composition which can be cured below 40° C., a method of coating fiber/polymer composites, the preparation of curable compositions, and a modular system for preparing said compositions.

12 Claims, No Drawings

CURING COMPOSITIONS FOR COATING COMPOSITE MATERIALS

CROSS REFERENCE TO RELATED APPLICATIONS

This application is a National Phase Application of Patent Application PCT/EP2009/006628 filed on 14 Sep. 2009, which claims priority to DE 10 2008 047 359.6, filed 15 Sep. 2008, both of which are hereby incorporated by reference in their entirety.

FIELD OF THE INVENTION

The present invention relates to the use of compositions curable below 40° C., to a method of coating fiber/polymer composites, to coated fiber/polymer composites, to curable compositions and their preparation, to single-coat and multi-coat paint systems which comprise these compositions, and also to a modular system for preparing said compositions.

BACKGROUND OF THE INVENTION

A composite material is a material of construction comprising two or more integrated materials. The term includes the fiber/polymer composites (FPCs), also referred to as fiber composite plastic or fiber reinforced plastic, which are composed of reinforcing fibers and a polymeric matrix. Examples of reinforcing fibers which can be employed are carbon, glass or aramid fibers. The fiber/polymer composites are referred to, accordingly, as carbon fiber reinforced plastics (CRP), glass fiber reinforced plastics (GRP), and aramid fiber reinforced plastics (ARP).

In the aerospace sector, alloy metal such as aluminum is being replaced more and more by such fiber/polymer composites. The advantage of these materials lies in their weight, which is lower in relation to alloy metal and steel, and also in their high specific strength and stiffness.

The requirements imposed on aircraft coatings are particularly exacting. Thus the requirement of safety is much more stringent than it is, for example, in the automobile segment. Moreover, the coatings are to protect the substrate for a number of decades, are to overcome ambient conditions entailing frequent fluctuations, such as extreme pressure and temperature fluctuations, for example, and also elevated UV exposures, and to satisfy esthetic requirements, such as high gloss and good leveling. The outer skin comes into contact with a variety of service fluids and auxiliaries, such as kerosene or oils, and also with de-icing products, and must be protected accordingly by the paint system. Furthermore, the coatings ought to adhere well to the substrate. Principally, in the case of fiber/polymer composites (FPCs) which have a high electrical resistance, moreover, additional requirements are imposed on the surface, in order to achieve improved dissipation of excessive electrical charges, in order, for example, to distribute the energy after a lightening strike. Therefore, an aircraft coating applied to FPC ought to have at least one coating which allows the resistance of the surface to be reduced and electrostatic dissipation to be achieved. This function may be obtained, for example, by virtue of an antistatic coating.

In aircraft engineering there are national and international standards setting threshold values for the paint systems. The surface resistance, for example, ought typically to have a value of around $10^6$ ohm.

The surface resistance (also called leak resistance) provides information on the insulation state prevailing on the surface of a coating, or the propensity of the nonconductor to form a conducting surface layer. The surface resistance may be altered by external influences such as moisture, acid, etc. It can be determined, for example, with the aid of a reed comb electrode (Römpp Lexikon Lacke and Druckfarben, Georg Thieme Verlag Stuttgart 1998, ISBN 3-13-776001-1, entry heading "Oberflächenwiderstand").

In aircraft engineering, a metal substrate is typically pretreated in order to remove impurities completely. FPCs, in contrast, are usually not pretreated. In particular there is no chemical pretreatment with, for example, organic solvents, so as to prevent swelling of the material. The only suitable methods would be physical methods such as corona discharge, for example. Instead, FPCs are coated with an in-mold primer, before then being provided with a primer-surfacer as a priming coat. Thereafter a topcoat finish is applied. This topcoat finish comprises basecoat and clearcoat. Depending on requirement and on customer stipulation, the in-mold primer and parts of the topcoat system may be omitted. In OEM aircraft engineering, the individual parts are in many cases already individually coated. Following final assembly, there are, first of all, test flights, before the final paint finish, usually a topcoat, is applied. Because of the characteristics of the substrate, the paint system—both in OEM aircraft engineering and in maintenance—cannot be subjected to a thermal cure. The melting temperatures or glass transition temperatures may be situated in ranges as low as about 70° C. Also, in view of the dimensions of a fully assembled aircraft or its component parts, no thermal cure is possible.

U.S. Pat. No. 4,155,896 discloses an antistatic, nonaqueous coating composition for aircraft. The composition there is suitable for coating aluminum substrates.

WO2008/085550 describes electrically dissipating coating compositions for aircraft, which are applied to commercial primer-surfacers, which prevent layers of ice forming.

Patent application DE19948821 describes electrically conductive hydroprimers for plastics, including fiber reinforced plastics. These plastics, however, are not applied in aircraft engineering or in space travel.

Now, though, the aim more and more is to reduce the fraction of solvents and to provide water-based coating systems.

It was an object of the present invention to meet the requirements described above that are imposed on a primer-surfacer for the aerospace sector. The intention was to provide a waterborne composition which as a primer-surfacer is able to meet the exacting requirements imposed on an aircraft paint system and at the same time can be employed as an antistatic coating. The composition ought to cure at temperatures of less than 40° C., and ought to exhibit effective adhesion both to fiber/polymer composites directly and to fiber/polymer composites coated with in-mold primers. Furthermore, the primer-surfacer ought to exhibit good leveling and ought to be able to be applied at a high film thickness.

SUMMARY OF THE INVENTION

Found, surprisingly, has been a use of compositions curing below 40° C. as primer-surfacers for the coating of fiber/polymer composites ("compositions for inventive use"). Found accordingly has been the use of compositions curing below 40° C. as primer-surfacers for the coating of fiber/polymer composites, said compositions comprising a. 1%-50% by mass of at least one hydroxy-functional binder selected from the group consisting of poly(meth) acrylates, polyesters, and polyurethanes,
b.
   i. 0.01%-25% by mass of at least one conductive pigment selected from the group consisting of conductive carbon blacks, graphene, fullerenes, conductive barium sulfate, doped pearlescent pigments, and metal pigments,
   or
   ii. 0.001%-5% by mass of at least one conductive pigment selected from nanoparticles and conductive polymers,
c. 5%-80% by mass of at least one nonconductive pigment,
d. 0.001%-25% by mass of at least one compound selected from the group consisting of polyethers, oligoethers, polysiloxanes, and aliphatic ethynols, as flow control agent,
e. 0.05%-20% by mass of at least one nonblocked isocyanate,
f. 10%-60% by mass of water, and
g. 0%-20% by mass of organic solvents,
the percent by mass figures being based on the total mass of the composition.

Particularly surprising in this context was the fact that there must be at least one conductive pigment and at least one nonconductive pigment present.

Components a to g are each different from one another.

DETAILED DESCRIPTION OF AN EMBODIMENT OF THE INVENTION

The composition for inventive use is a two-component coating material. Two-component coating materials are coating materials in which the chemical reaction that leads to curing is initiated by the mixing of two components (millbase and curing agent). Millbases are components in two-component coating materials that comprise constituents without curing agents (Römpp Lexikon Lacke and Druckfarben, Georg Thieme Verlag Stuttgart 1998, ISBN 3-13-776001-1, entry headings "Zweikomponenten-Lacke", "Stammlack").

Advantageous compositions for inventive use are those which cure below 35° C., preferably below 30° C., very preferably below 25° C., and more particularly at 18 to 23° C. These compositions may also be cured additionally with actinic radiation. By actinic radiation is meant electromagnetic radiation such as near infrared (NIR), visible light, UV radiation, and X-rays, more particularly UV radiation, or particulate radiation, such as electron beams.

The dry film thickness of the compositions for inventive use is advantageously 40 to 120 μm. Typically the dry film thickness is 40 to 80 μm, such as, for example, 50 to 70 μm. The compositions for inventive use may alternatively be applied with higher dry film thicknesses of up to 100 or 120 μm.

Preferably the composition used is employed simultaneously as an antistatic coating of the FPC.

The composition used in accordance with the invention preferably has a surface resistance of $10^2$ to $10^8$ ohm, more preferably of $10^4$ to $10^7$ ohm, and very preferably of $10^5$ to $5 \cdot 10^6$ ohm.

For the measurement of the surface resistance, two electrodes are placed on the surface of a solid body (the specimen), and a voltage is applied to these electrodes. The surface resistance is calculated from the current that then flows along the surface. The surface resistance can be measured using, for example, the high-voltage measuring instrument HM 307D with Faraday cage and also concentric ring electrodes from Fetronic GmbH, Langenfeld, Germany.

The FPCs coated with the composition used in accordance with the invention are employed preferably in aircraft and/or space-travel engineering. Preferred FPCs are carbon fiber reinforced plastics (CRP), glass fiber reinforced plastics (GRP), and aramid fiber reinforced plastics (ARP). Particular preference is given to carbon fiber reinforced plastics. Advantageously the carbon fiber reinforced plastics are produced from carbon fibers and a matrix comprising epoxy resins.

The composition for inventive use contains 1-50% by mass, based on the total mass of the composition, of at least one hydroxy-functional binder. Said binder is selected from the group of poly(meth)acrylates, polyesters, and polyurethanes. Preferably at least one hydroxy-functional poly(meth)acrylate and at least one polyester or at least one polyurethane are used. Owing to the hydroxy functionality of the binders they are free from isocyanate groups.

The composition for inventive use contains preferably 5-25% by mass, more preferably 10-20% by mass, of hydroxy-functional binders.

As poly(meth)acrylates, both polyacrylates and polymethacrylates are understood.

Suitable hydroxy-functional poly(meth)acrylates, hydroxy-functional polyesters, and hydroxy-functional polyurethanes for coatings which cure via nonblocked polyisocyanates are known to the skilled worker. They are specified in, for example, patent applications DE 196444615, WO2005/110622, and DE 19948821.

The binders may contain free-radical crosslinkable components which allow additional actinic curing. By way of example, mention may be made of C=C double bonds as functional groups in the binders. Preferably the hydroxy-functional binders are free from actinically curable groups.

Furthermore, the composition for inventive use may comprise further binders. These binders may be hydroxy-functional or non-hydroxy-functional.

The binder or binder mixture advantageously has in total an arithmetically determined OH number of 0.1 to 50 mg KOH/g. OH numbers in the range from 0.1 to 20 mg KOH/g are particularly advantageous, those of 0.4 to 10 mg KOH/g especially advantageous. The arithmetically determined OH number of the binder or binders is calculated from the monomer composition.

A further essential constituent of the composition for inventive use is at least one electrically conductive pigment which is selected from the group consisting of conductive carbon blacks, graphene, fullerenes, conductive barium sulfate, doped pearlescent pigments, metal pigments, nanoparticles, and conductive polymers. Preference is given to conductive carbon blacks, conductive barium sulfate, doped pearlescent pigments, and metal pigments. Particular preference is given to conductive carbon blacks. A suitable example is Ketjenblack® from Akzo Nobel.

Conductive carbon blacks, conductive barium sulfate, doped pearlescent pigments, and metal pigments are described in, for example, Römpp Lexikon Lacke and Druckfarben, Georg Thieme Verlag Stuttgart 1998, ISBN 3-13-776001-1, entry heading "Leitfähige Pigmente", and also in patents EP1600484, EP1647583 and DE-A-19948821.

Suitable nanoparticles are, for example, carbon nanotubes, as described in EP1756668.

Examples of suitable conductive polymers include polypyrroles, as disclosed in JP2005154632, polyanilines from EP1756668, and cationic polymers from U.S. Pat. No. 4,011,176.

The carbon black advantageously has a particle size, also called fineness of grind, of 20 µm or less. A particularly advantageous particle size is one of 10 µm or less.

The particle size is determined by means of a model 232 Hegman grindometer from Erichsen GmbH & Co. KG, Hemer, Germany. In this determination, a liquid wedge of the test substance is produced on the instrument. The test substance employed is a paste which comprises the carbon black along with at least one binder and water. If the particle measurements are larger than the local wedge thickness, this is apparent to the eye. The associated wedge thickness, corresponding to the particle size, is read off at the boundary between disturbed and smooth liquid surfaces.

The procedure for the measurement is to introduce a sufficient amount of the sample, without air inclusions, at the lowest points of the grooves in the grindometer. Thereafter the material is drawn steadily toward the shallow end within one to two seconds. In this procedure a straightedge is held perpendicularly both to the surface of the test value and to the grooves. The evaluation must be made within 3 s after the sample has been drawn out: for this purpose, the surface of the sample is inspected against a light source, from a shallow angle) (20°-30°, at right angles to the grooves. The point is located at which accumulated particles and/or their scratch tracks start to be visible. The particle size is defined as the assigned groove depth at this location.

The amount of electrically conductive pigments may vary very widely and is 0.01%-25% by mass, based on the total mass of the composition, of conductive carbon blacks, graphene, fullerenes, conductive barium sulfate, doped pearlescent pigments, and metal pigments. Preferably their fraction is 0.01% to 5% by mass.

The amount of nanoparticles and conductive polymers, based on the total mass of the composition, is 0.001%-5% by mass. Preferably the amount is 0.005% to 1% by mass.

The pigments can also be incorporated into the composition for inventive use via pigment pastes.

The composition for inventive use further contains 5%-80% by mass, based on the total mass of the composition, of at least one nonconductive pigment. Examples of suitable pigments are rutile (titanium dioxide), lime, silicon dioxide, talc and silica. It is advantageous to use rutile as a nonconductive pigment. The rutile preferably has a particle size of less than 40 µm, more preferably less than 35 µm, and with particular preference less than 30 µm. The particle size is determined by means of a fabric screen. The nonconductive pigment is applied to a fabric screen of defined size. The screened fraction has a particle size which is equal to or smaller than the mesh size of the screen.

Further nonconductive pigments are, for example, organic or inorganic pigments, and also fillers such as calcium sulfate, nonconductive barium sulfate, silicates such as talc, bentonite or kaolin, silicas, oxides such as aluminum hydroxide or magnesium hydroxide, organic fillers such as textile fibers, cellulose fibers, polyethylene fibers or wood flour, iron oxide, zinc phosphate or lead silicate.

The composition for inventive use preferably contains 10% to 50% by mass of nonconductive pigments.

In one preferred embodiment of the invention the conductive pigment comprises at least one carbon black and the nonconductive pigment comprises at least rutile.

The composition for inventive use further comprises at least one compound selected from the group consisting of polyethers, oligoethers, polysiloxanes, and aliphatic ethynols, as flow control agents. Flow control agents are substances which, by lowering the viscosity and/or surface tension, assist wet coating materials to form films which flow out evenly (Römpp Lexikon Lacke und Druckfarben, Georg Thieme Verlag Stuttgart 1998, ISBN 3-13-776001-1, entry heading "Verlauf(hilfs)mittel"). Polysiloxanes are particularly preferred. The composition contains 0.001%-25% by mass of said flow control agents, based on the total mass of the composition. Preferably there is 0.001%-25% by mass, more preferably 0.001%-5% by mass, present.

Additionally present in the composition for inventive use is 0.05%-20% by mass, based on the total mass of the composition, of at least one nonblocked polyisocyanate. These nonblocked polyisocyanates function as curing agents. Curing agents are the components in a two-component coating material which, after being mixed with the millbase, bring about chemical crosslinking (Römpp Lexikon Lacke und Druckfarben, Georg Thieme Verlag Stuttgart 1998, ISBN 3-13-776001-1, entry heading "Härter").

Nonblocked polyisocyanates are those polyisocyanates which contain at least two free NCO groups. Nonblocked polyisocyanates are preferably free from blocked NCO groups.

Suitable nonblocked polyisocyanates include in principle all of the typical and known aliphatic, cycloaliphatic, aliphatic-cycloaliphatic, aromatic, aliphatic-aromatic and/or cycloaliphatic-aromatic polyisocyanates and polyisocyanate adducts that are used in the coatings field, and are also referred to as paint polyisocyanates. Especially suitable polyisocyanates, in addition to diisocyanates, include, in particular, oligomers and/or polymers of diisocyanates.

Oligomers and polymers which can be used are polyisocyanates of higher functionality, having a statistical average functionality of 2.5 to 6, more particularly 2.5 to 5.

Examples of suitable polyisocyanates of higher functionality are polyurethane prepolymers which contain isocyanate groups, can be prepared by reacting polyols with an excess of diisocyanates, and are of preferably low viscosity. It is also possible to use polyisocyanates containing isocyanurate, biuret, allophanate, iminooxadiazinedione, urethane, urea, carbodiimide and/or uretdione groups. Polyisocyanates containing urethane groups, for example, are obtained by reacting some of the isocyanate groups with polyols, such as trimethylolpropane and glycerol, for example. Preference is given to using the diisocyanates described in detail below, or their oligomers or polymers.

Very particular preference is given to using mixtures of polyisocyanate adducts that contain uredione and/or isocyanurate and/or allophanate groups and are based on hexamethylene diisocyanate—as are formed by catalytic oligomerization of hexamethylene diisocyanate using suitable catalysts—and based on isophorone diisocyanate.

Examples of suitable diisocyanates are isophorone diisocyanate (IPDI; =5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, liquid dicyclohexylmethane 4,4'-diisocyanate with a trans/trans content of up to 30% by mass, preferably 25% by mass, and in particular 20% by mass, which is obtainable by phosgenating isomer mixtures of bis(4-aminocyclohexyl)methane or by fractional crystallization of commercial bis(4-isocyanatocyclohexyl)methane in accordance with patents DE-A-4414032, GB-A-1220717, DE-A-1618795 or DE-A-1793785; trimethylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimer fatty acids, as sold by Henkel under the trade name DDI 1410 and described in patents WO 97/49745 and WO 97/49747, more particularly 2-heptyl-3,4-bis(9-isocyanatononyl)-1-pentylcyclohexane, 1,2-, 1,4- or 1,3-bis(isocyanatomethyl)-cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, m-tetramethylxylylene diisocyanate (i.e., 1,3-bis-(2-isocyanatoprop-2-yl)benzene) or tolylene diisocyanate.

Especially preferred diisocyanates are hexamethylene diisocyanate and isophorone diisocyanate.

Preferably, mixtures of diisocyanates and also their oligomers and polymers function as nonblocked polyisocyanates. Use is made more particularly of hexamethylene diisocyanate, isophorone diisocyanate and their oligomers and polymers as nonblocked polyisocyanates.

The quantitative ratio between the binder component and the polyisocyanate component is chosen such that the number of OH groups relative to the number of reactive, nonblocked NCO groups is in a molar ratio of 1:0.5 to 1:3, preferably 1:1 to 1:2.

The composition for inventive use may comprise further curing agents other than nonblocked polyisocyanates. Oligomeric siloxanes as well may be present as curing agents. Preferably, however, no oligomeric siloxanes are present as curing agents.

The composition for inventive use additionally contains 10%-60% by mass of water, based on the total mass of the composition. Preferably the composition for inventive use contains 20%-40% by mass, more preferably 30%-40% by mass.

As a further component, the composition for inventive use may comprise at least one organic solvent. Solvents for the purposes of this invention are organic liquids which are able to dissolve other gaseous, liquid or solid substances. These solvents may be inert toward the other constituents of the composition for use, or may function as a diluent that becomes part of the binder, by chemical reaction, in the course of film formation (known as reactive diluents). It is preferred to use solvents which are inert toward the other composition constituents.

Examples of suitable organic solvents are aromatic, aliphatic or cycloaliphatic hydrocarbons and also aliphatic alcohols, aliphatic ketones, and aliphatic amines.

The composition for inventive use contains 0%-20% by mass of organic solvents, based on the total mass of the composition, Preferably the composition contains 1-12% by mass of organic solvents, very preferably 2-10% by mass.

Furthermore, the composition for inventive use may comprise additives different than the aforementioned components a to g. Examples of suitable additives are
dispersants;
free-radical scavengers;
organic corrosion inhibitors;
crosslinking catalysts such as organic and inorganic salts and complexes of tin, lead, antimony, bismuth, iron or manganese, preferably organic salts and complexes of bismuth and of tin, more particularly bismuth lactate, ethyl hexanoate or dimethylolpropionate, dibutyltin oxide or dibutyltin dilaurate;
slip additives;
polymerization inhibitors;
defoamers;
emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;
wetting agents;
film-forming assistants such as cellulose derivatives;
flame retardants;
anticrater agents;
rheologic control additives.

Further examples of suitable coating additives are described in the textbook "Lackadditive" [Additives for Coatings] by Johan Bieleman, Wiley-VCH, Weinheim, New York, 1998.

The composition for inventive use preferably comprises dispersants and film-forming assistants.

The composition for inventive use may be prepared from a modular system which comprises
a. a binder module comprising
   i. all the binders and
   ii. water and
b. a curing agent module comprising
   iii. all the nonblocked isocyanates,
   iv. where appropriate, all the further curing agents, and
   v. water and/or organic solvents.

The further constituents of the composition for inventive use may be present in the binder module, in the curing agent module or in both modules. The further constituents may equally well be divided over further modules. The organic solvents may also be present partly or fully in the binder module.

The invention further provides a method of coating fiber/polymer composites as a substrate for aircraft or space-travel engineering. This method is carried out by applying to the substrate, in this order
a. where appropriate, an in-mold primer,
b. at least one composition for inventive use, and
c. at least one topcoat which is composed of
   i. at least one basecoat and/or
   ii. at least one clear coat, the composition for inventive use being fully cured and the topcoat then being applied and cured, or the topcoat being applied before the full curing of the composition for inventive use, and films b and c being jointly fully cured. Preferably the composition for inventive use is cured fully first of all.

The substrate is not, as is usually the case with aluminum substrates, pretreated chemically. It may, however, be pretreated physically. It is possible, though, to apply an in-mold primer as a first coat to the substrate, and this is preferred. In-mold primers serve as an adhesion base for the rest of the coating system, and serve to level the usually rough surface of the substrate composite. Suitable in-mold primers may be prepared on an epoxy basis or on an isocyanate-curable poly(meth)acrylate basis.

The curing temperature for the composition for inventive use is to be chosen such that the structure and construction of the substrate are not altered and/or are not damaged. In view of the characteristics of the compositions, a curing temperature even of less than 40° C. is sufficient.

The composition for inventive use is applied so as to give, preferably, a dry film thickness of 40 to 120 μm. Typically the dry film thickness is 40 to 80 μm, preferably 50 to 70 μm. Alternatively the compositions for inventive use may be applied with higher dry film thicknesses, of up to 100 or 120 μm.

The topcoat is composed of at least one basecoat, at least one clearcoat, or at least one basecoat and at least one clearcoat. Where the topcoat is composed of both basecoat and clearcoat, the basecoat is applied first and then the clearcoat. Multiple application of basecoat and/or clearcoat is possible. Preferably the topcoat is composed of basecoat and clearcoat or only of clearcoat. More preferably the topcoat is composed of basecoat and clearcoat. With particular preference, one coat each of basecoat and clearcoat are applied. If, however, the basecoat is high in solids, i.e., if a solids content of 70% or more is attained (known as high solids), the clearcoat is preferably not used. The solids content is the mass fraction that remains as a residue on evaporation at 120° C. for 60 minutes.

As basecoats and clearcoats it is possible to use typical basecoats and clearcoats, the majority of which crosslink chemically. Preferred coating materials cure at below 40° C., more preferably at below 35° C., very preferably at below 30° C., and more particularly below 25° C. Use is made typically of polyurethane systems (isocyanate curing agent plus OH-containing binder).

The dry film thickness of the topcoat system is preferably 60 to 100 μm.

Additionally provided in the context of the invention are coated fiber/polymer composites which are obtained by the coating method specified above.

Additionally provided are compositions which cure below 40° C. ("inventive compositions"). These compositions comprise the following components:
a. 1%-50% by mass of a binder mixture comprising at least one hydroxy-functional poly(meth)acrylate and at least one further hydroxy-functional binder selected from polyesters and polyurethanes,
b.
 i. 0.01%-25% by mass of at least one conductive pigment selected from the group consisting of conductive carbon blacks, graphene, fullerenes, doped pearlescent pigments, and metal pigments,
 or
 ii. 0.001%-5% by mass of at least one conductive pigment selected from nanoparticles and conductive polymers,
c. 5%-80% by mass of at least one nonconductive pigment,
d. 0.001%-25% by mass of at least one compound selected from the group consisting of polyethers, oligoethers, polysiloxanes, and aliphatic ethynols, as flow control agent,
e. 0.05%-20% by mass of at least one nonblocked isocyanate,
f. 10%-60% by mass of water, and
g. 0%-20% by mass of organic solvents,
the % by mass figures being based on the total mass of the composition.

As binders it is possible to use the binders already described above, in the amounts specified above.

The information given above in relation to the composition for inventive use may be transposed analogously to the inventive composition. For instance, information on mass fractions and examples, especially the preferred embodiments, concerning the conductive pigments, the nonconductive pigments, the compounds that act as flow control agents and are selected from the group consisting of polyethers, oligoethers, polysiloxanes, and aliphatic ethynols, the nonblocked isocyanates and further curing agents, the water, and the organic solvents, also apply analogously for the inventive compositions.

The inventive composition may also comprise the further additives identified above.

The inventive composition cures preferably at temperatures below 35° C., more preferably below 30° C., very preferably below 25° C., and more particularly at 18 to 23° C.

The invention further provides a method of preparing the inventive composition. This method comprises
a. mixing and grinding at least one binder of the inventive composition, at least one conductive pigment, and water to a paste, and
b. mixing the paste with at least one nonconductive pigment and at least one compound as flow control agent, selected from the group consisting of polyethers, oligoethers, polysiloxanes, and aliphatic ethynols,
to give a component I, and then mixing said component
c. with the nonblocked polyisocyanate(s) as component II.

The invention further provides a single-coat or multicoat paint system which comprises at least one paint film of the inventive composition. The multicoat paint system may further comprise at least one above-described in-mold primer and/or at least one above-described topcoat. The sequence of application and curing of the films is analogous to that of the above-described method of coating for the composition for inventive use. The coating film obtained from the inventive composition is preferably applied so as to give a dry film thickness of 40 to 120 μm. Typically the dry film thickness is 40 to 80 μm, preferably 50 to 70 μm. The compositions for inventive use, however, can also be applied in such a way that higher dry film thicknesses, of up to 100 or 120 μm, are obtained.

The invention further comprises fiber/polymer composites coated with the inventive composition.

A further part of the invention is a modular system for preparing the inventive compositions. This system comprises
a. a binder module comprising
 i. all the binders and
 ii. water and
b. a curing agent module comprising
 i. all the nonblocked polyisocyanates,
 ii. where appropriate, all further curing agents, and
 iii. water and/or organic solvents.

The further constituents of the inventive composition may be present in the binder module, in the curing agent module or in both modules. The further constituents may equally be divided over further modules. The organic solvents may also be present partly or fully in the binder module.

One preferred modular system for preparing inventive compositions comprises
a. the binder module comprising
 i. all the binders,
 ii. at least one conductive pigment,
 iii. at least one nonconductive pigment,
 iv. at least one flow control agent, and
 v. water
and
b. the curing agent module comprising
 i. all the nonblocked polyisocyanates,
 ii. where appropriate, all the further curing agents, and
 iii. organic solvents.

In the text below, the invention is elucidated in more detail with reference to examples.

Examples

1. Primer-Surfacer Preparation

1a. Paste

In a suitable stirring vessel, the components indicated in the table below were added in succession with stirring, slowly, at room temperature (21° C.) and homogenized (about 1250-1500 rpm). The material was subjected to the action of a dissolver at 3000 rpm for about 15 minutes. Subsequently this material was ground to a particle size<10 µm, using a bead mill, for about 2 hours.

| Parts (mass) | Substance |
|---|---|
| 18.56 | hydroxyl-containing binder |
| 0.17 | commercial dispersant for the aqueous area |
| 0.65 | commercial conductive carbon black |
| 3.98 | water |

1b. Completion

In a suitable stirring vessel, the substances in the table below were combined with stirring and homogenized.

| Parts (mass) | Function |
|---|---|
| 23.36 | Paste 1a |
| 66.90 | Rutile paste, dispersed with a hydroxyl-containing polyester and a hydroxyl-containing polyurethane |
| 5.03 | organic solvents |
| 0.57 | commercial polyether-based dispersant |
| 0.25 | commercial polysiloxane-based defoamer |
| 0.98 | commercial dispersant based on polyether-modified siloxane |
| 2.91 | Water |

Mixture 1b has an arithmetically determined OH number of 0.5 mg KOH/g.

1c. Curing Agent

In a suitable stirring vessel, the raw materials identified in the table below were combined with stirring and homogenized.

| Parts (mass) | Raw material |
|---|---|
| 32.25 | IPDI polymer |
| 0.23 | IPDI |
| 0.1 | HDI |
| 32.4 | HDI polymer |
| 35 | organic solvents |

2. Application

The coating material from experiment 1b is added in a mass ratio of 100:5 to the curing agent 1c, giving a ratio of OH to NCO groups of 1:1.46.

Using a spray gun (Devilbiss GFG gravity-feed spray gun), the primer-surfacer was applied with a wet film thickness of 60 µm to a carbon fiber reinforced plastic whose matrix comprises epoxy resins, resulting in a dry film thickness of 55 µm. After 4 hours at 25° C., the surface resistance as measured by means of a high-voltage measuring instrument (concentric ring electrodes, Faraday cage, high-voltage measuring instrument HM 307D from Fetronic GmbH) was $10^6$ ohm.

What is claimed is:

1. A method of coating a fiber/polymer composite with a primer surfacer, comprising applying to the composite a composition curable below 40° C. and comprising
   a. 1%-50% by mass of at least one hydroxy-functional binder selected from the group consisting of poly(meth)acrylates, polyesters, and polyurethanes,
   b. 
      i. 0.01%-5% by mass of at least one electrically conductive pigment selected from the group consisting of conductive carbon blacks, graphene, fullerenes, doped pearlescent pigments and conductive barium sulfate,
      or
      ii. 0.001%-5% by mass of at least one electrically conductive pigment selected from carbon nanotubes and conductive polymers,
   c. 5%-80% by mass of at least one electrically nonconductive pigment selected from the group consisting of titanium dioxide, lime, silicon dioxide, talc and silicas,
   d. 0.001%-25% by mass of at least one compound selected from the group consisting of polyethers, oligoethers, polysiloxanes, and aliphatic ethynols, as flow control agent,
   e. 0.05%-20% by mass of at least one nonblocked polyisocyanate,
   f. 10%-60% by mass of water, and
   g. 0%-20% by mass of organic solvents,
so as to produce a coating, and wherein the percent by mass figures are based on the total mass of the composition.

2. The method of claim 1, wherein the primer-surfacer is an antistatic coating of the composite.

3. The method of claim 2, wherein the coating has a surface resistance of $10^2$ to $10^8$ ohm.

4. The method of claim 1, wherein the primer surfacer is applied to a fiber/polymer composite which is at least part of a substrate of an aircraft and/or space-travel engineering.

5. The method of claim 1, wherein the composition comprises further binders.

6. The method of claim 1, wherein at least one carbon black is included as electrically conductive pigment and at least titanium dioxide is included as electrically nonconductive pigment.

7. The method of claim 6, wherein the carbon black has a particle size of 20 µm or less.

8. The method of claim 1, wherein the organic solvent is selected from the group consisting of aromatic hydrocarbons, aliphatic hydrocarbons, cycloaliphatic hydrocarbons, aliphatic alcohols, aliphatic ketones, and aliphatic amines.

9. The method of claim 1, wherein the composition is preparable from a modular system comprising
   a. a binder module comprising
      i. all the binders and
      ii. water, and
   b. a curing agent module comprising
      i. all the nonblocked polyisocyanates,
      ii. where appropriate, all the further curing agents, and
      iii. water and/or organic solvents.

10. The method of claim 1, further comprising applying, in the following order;
   a. where appropriate, an in-mold primer,
   b. at least one composition as applied in claim 1,
   c. at least one topcoat which is composed of
      i. at least one basecoat and/or
      ii. at least one clearcoat,
the composition being fully cured and the topcoat then being applied and cured or
the topcoat being applied before the composition is fully cured, and the films b and c being jointly fully cured.

11. The method of claim 1, wherein the fiber/polymer composite is selected from the group consisting of carbon fiber reinforced plastics, glass fiber reinforced plastics and aramid fiber reinforced plastics.

12. A coated fiber/polymer composite made by the method of claim 10.

* * * * *